United States Patent [19]

Billet

[11] Patent Number: 4,601,529

[45] Date of Patent: Jul. 22, 1986

[54] DEVICE FOR INTERCONNECTING OVERHEAD AND UNDERGROUND LOW-VOLTAGE ELECTRIC CABLES

[75] Inventor: Claude Billet, Fontenay sous Bois, France

[73] Assignee: Treficable Pirelli, Saint Maurice, France

[21] Appl. No.: 614,873

[22] Filed: May 29, 1984

[30] Foreign Application Priority Data

May 30, 1983 [FR] France ............................... 83 09304

[51] U.S. Cl.[4] ......................................... H01R 11/00
[52] U.S. Cl. ............................... 339/60 M; 339/60 R
[58] Field of Search ............................... 339/60, 62, 63

[56] References Cited

U.S. PATENT DOCUMENTS 3,850,495 11/1974 Glover ............................ 339/60 M
4,090,759 5/1978 Herrmann, Jr. ................. 339/60 M Primary Examiner—Gil Weidenfeld
Assistant Examiner—Paula A. Austin
Attorney, Agent, or Firm—Brooks Haidt Haffner & Delahunty

[57] ABSTRACT

A device for interconnecting the conductors of an overhead, multi-conductor cable with the conductors of an underground, multi-conductor cable which protects the connections and permits them to be at the same level and which can be installed in the field without heating apparatus. The conductors of one cable are electrically and mechanically connected to the conductors of the other cable by conventional conductive clamps, and the clamps are covered by insulating, elastic, two-part sleeves which extend to the insulation of the conductors and the parts of which are interfitting. The sleeves are surrounded by a two-part, elastomeric material, protective housing, the parts of which are interfitting. The insulated conductors of the overhead conductor pass through elastic nipples which provide a watertight seal between the conductor insulation and the housing.

12 Claims, 5 Drawing Figures

DEVICE FOR INTERCONNECTING OVERHEAD AND UNDERGROUND LOW-VOLTAGE ELECTRIC CABLES

The present invention relates to a connecting device for the overhead to underground connection of low-voltage electric cables.

In low-voltage distribution networks, it is usual for an underground cable to have to be connected to an overhead cable on a pole.

As a general rule, the underground cable is of the insulated-screened type, for instance of type HN-33-S-33 ("Electricite de France" standard), having three conductors plus neutral (round or sector-shaped). The overhead cable is generally of the "twisted" type having three round conductors of aluminum plus an "ALMELEC" neutral serving as carrier, having a cross section of 54.6 mm$^2$ (UTE France Standard C33209).

At the present time, the connecting of an underground cable to an overhead cable is generally effected by means of clamped connectors insulated by a heat-shrinkable sleeve; this method has the drawback that it takes up a large amount of space due to the necessity of staggering the connectors of each phase one from the other in order to avoid any danger of flashover. Furthermore, heat shrinking on the job means the use of a hot air generator with air-propane burner which is unwieldy and at times dangerous when working on a pole.

The device forming the object of the present invention makes is possible to solve the problem of forming an insulated, watertight connection, in the field, of a low-voltage underground cable and an overhead cable without the use of tools or a hot-air generator.

This device comprises, on the one hand, a bipartite sleeve insulating the clamped connector of each of the four conductors and, on the other hand, a bipartite jacket for the protection of the four connectors which are arranged at the same level in compact juxtaposed relationship.

Other objects and advantages of the present invention will be apparent from the following detailed description of the presently preferred embodiments thereof, which description should be considered in conjunction with the accompanying drawings in which.

Figure 1:
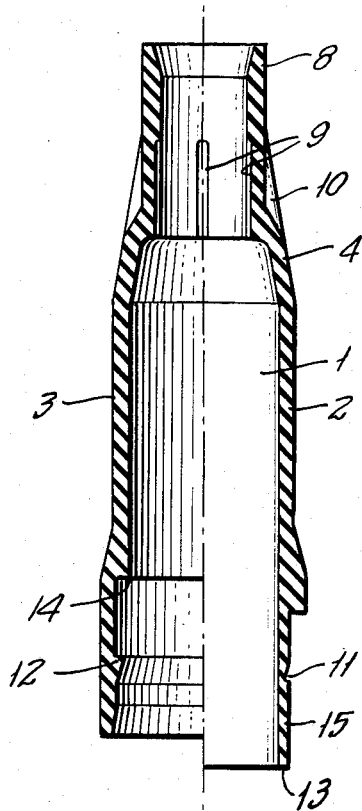
FIG. 1 shows, in longitudinal section, the female part of the sleeve on the left-hand side and the male part on the right-hand side.
Figure 2:
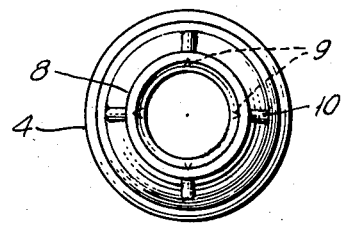
FIG. 2 shows a sleeve in top view.
Figure 3:
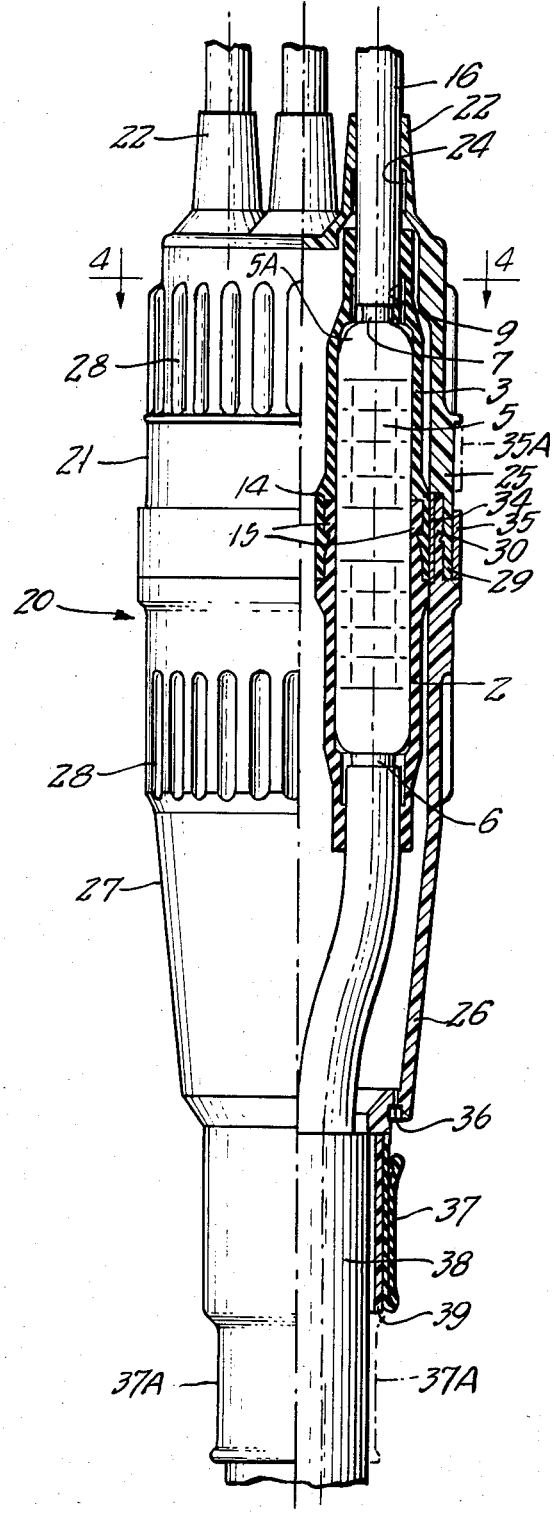
FIG. 3 shows a complete connection in accordance with the invention, seen in longitudinal section on the right-hand side and in outside view on the left-hand side.

Each part (2) (3) of the insulating sleeve (1) comprises a flexible body (4) whose inside diameter is adapted to the outside diameter of the clamping connector (5) which in known manner assures the mechanical and electrical connection between each conductor (6) of the underground cable and the corresponding conductor (7) of the overhead cable. The neck (8) of the sleeve has an internal diameter which is adapted to the outside diameter of the insulation (16) of each conductor 6 and 7. Whether the conductors (6) of underground cable are of the round of the "sector" type, the fitting is effected without difficulty due to the elasticity of the sleeve and tightness is assured in all cases. The axis of the sleeve (1) is substantially identical to the axis of the conductor.

The inner surface of the neck has a plurality of grooves (9) which are intended to receive a supply of lubricating grease in order to facilitate the sliding of the sleeve on the insulation of the conductor. The connecting region between the neck (8) and the body (4) may have reinforcement ribs (10).

The lip (15) of one of the sleeves—in FIG. 1 it is the male sleeve—may have an external peripheral groove (11) which cooperates with an inner peripheral protrusion (12) on the other sleeve so as to facilitate positioning, assure a mechanical lock and further improve the tightness, if necessary.

Furthermore, the end (13) of one part of the sleeve, for example the male part, when put in place, abuts against the heel (14) of the other part of the sleeve.

Finally, the total length of the assembly consisting of the male sleeve and female sleeve which are joined together up to the stop (14) has a length which is in accord with the standard size of the clamped connectors (5).

The putting in place is effected in the manner that before connection, a female sleeve (for instance) is placed on each conductor on the overhead cable side and a male sleeve on the underground cable side. The sleeves are moved apart to free the place for the clamping and then brought back again by sliding—facilitated by the grease which fills the grooves (9)—and pushed together until in abutment. It will be noted that the four sleeves corresponding to the four conductors are located at the same level, resulting in a reduced length for the junction as a whole. The sleeves are made of an elastomer such as neoprene or EPDM (ethylene-propylene-diene monomer), which is called upon merely to assure the electrical insulation and tightness, the mechanical protection and weather protection being assured by the protective jacket.

The protective jacket (20) is made of an elastomer and is also formed in two parts. The upper part (21) on the overhead cable side, has four outlet nipples (22) whose inside diameter corresponds to the outside diameter of the insulation (16) of the conductors (6) of the overhead cable, to which they adapt themselves in tight relationship by their own elasticity. They also have internal grooves (24) which serve as storage space for lubricating grease to assure the sliding of the upper part (21) which, before clamping and coupling, must be placed over the overhead cable to be connected.

The body (25) of the upper part (21), as well as the body (26) of the lower part (27) of the jacket may have ribs (28) which impart a certain amount of rigidity and facilitate manual grasping. The lower part (27) must, of course, like the upper part, be placed over the underground cable to be connected before the clamping by coupling of the conductors.

The connecting of the top part (21) with the bottom part (27) is effected, as in the case of the sleeve, by interlocking between the lips (29) (30) with a stop at (31), and possibly one or more positioning means such as the peripheral groove (32) and the peripheral protrusion (33). One can, if necessary, provide two or more pairs of protrusions and grooves. For reasons of tightness with respect to dripping water it is customary to place the female part at the top.

The locking of the two parts (21) and (27) of the protective jacket (20) is assured by an inner rigid ring

(34) which rests against the inner face of the upper lip (30) of the male part (27), which ring (34) may be of rustproof metal or of relatively rigid plastic, such as filled polyvinylchloride. A second outer rigid ring (35), placed in upper position (35A) upon the mounting of the assembly, is lowered by sliding to the lower position (35) after assembly. The zone of overlap of the lips (29), (30) of the upper part (21) and the lower part (27) is thus clamped between the rigid rings (34) and (35), which eliminates any risk of accidental detachment. The outer ring (35) could be replaced by a metal or plastic clamping collar which would fulfill the same function in equivalent manner.

Finally, the bottom portion of the lower part (27) has, on the one hand, one or more vents (36) for aerating the interior of the jacket and avoiding any risk of the condensation of moisture and, on the other hand, a sealing means such as the skirt (37) which, upon assembly, can be rolled or folded upward and then unrolled downward (37A) so as to apply itself tightly, as a result of its own elasticity, against the external insulating sheathing (38) of the underground cable.

In order to facilitate the sliding of the lower jacket (27) on the underground cable at the time of assembly, it is supplied to the user with the skirt (37) rolled or folded onto the outer face of a rigid plastic ring (39) whose inside diameter is slightly greater than the outside diameter of the insulating sheathing (38). The sliding play is on the order of a millimeter so as to take into account tolerances in the diameters of the cables. After the jacket (20) has been put in place, the skirt (37) is unfolded or unrolled and the ring (39) remains in place.

Figure 4:
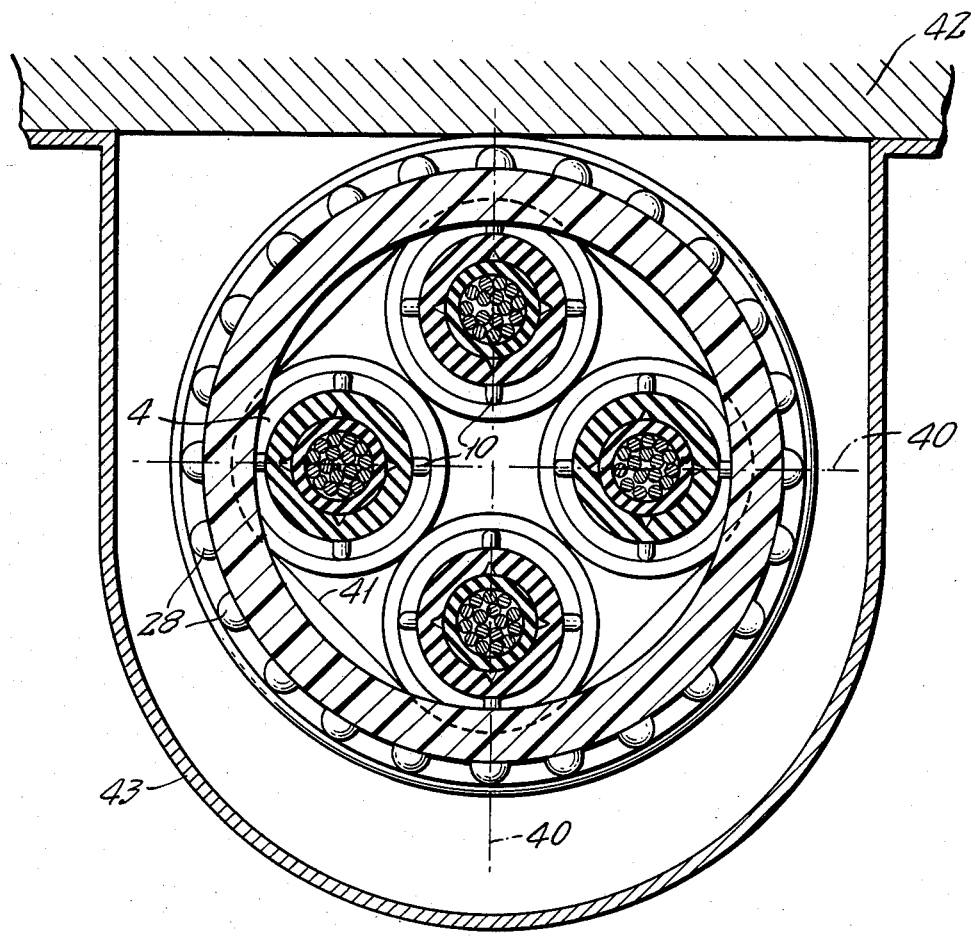
FIG. 4 is a cross section along the line 4—4 of FIG. 3.
Figure 5:
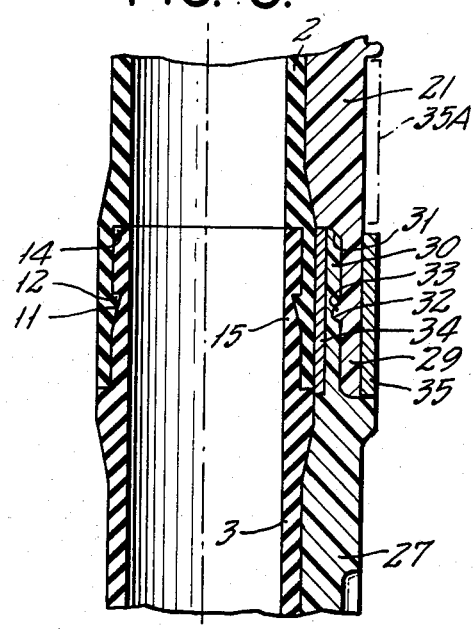
FIG. 5 is a partial longitudinal section on a larger scale of the region of connection of the sleeves.

In order to facilitate the positioning of the conductors (23) of the overhead cable in the upper portion (21) of the sleeve and to see to it that the four conductors (7) are actually in the axis of the outlet nipples (22), it is preferable that at least a part of the inner section of this upper portion (21) between the level corresponding substantially to the top (5A) of the clamping connector (5) and the level of the stop (31) be square, with rounded corners (see FIG. 4), the diagonals (40) of this square (41) being located substantially in the plane passing through the axes of two diametrically opposite nipples. In this way, the assembly consisting of the four conductors clamped and insulated by the sleeves (1) can be positioned only in compact, juxtaposed relation in the axis of each of the nipples, which facilitates and accelerates assembly.

As a general rule, the junction formed by the assembly consisting of the connections protected by the sleeves and by the protective jacket according to the invention rests against the pole (42) which supports the overhead line and it is protected from possible impacts by a metallic sheathing (43). Due to the fact that it is exposed to the weather and, in urban and industrial zones, to atmospheres which may be corrosive, the protective jacket (20) must be made of an elastomer material in accordance with the specifications of the operator, for instance "Electricite de France" Standard HN-33-E-60. Elastomer compositions having a base of neoprene or EPDM, containing known fillers and additives, meet these specifications.

The carrying out of the invention makes it possible to produce rapidly, without danger and without tools other than the customary clamping pliers, a tight and protected connection between low-voltage overhead cable and underground cable.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A device for interconnecting a plurality of insulated conductors of a multi-conductor, low voltage, overhead, electric cable with a plurality of insulated conductors of a multi-conductor, low voltage, underground, electric cable, said device comprising:
   a plurality of conductive clamps mechanically and electrically connecting an end of each conductor of the overhead cable, respectively, to an end of the conductors of the underground cable, each clamp surrounding an end of a conductor of the overhead cable and an end of a conductor of the underground cable;
   a plurality of separate, stretchable and elastic insulating, sleeves each made in two, separable and interengaging parts and each insulating sleeve surrounding and engaging a conductive clamp, one for each clamp; and
   a stretchable and elastic protective housing around and separable from said insulating sleeves, said protective housing being made of two separable and engaging parts, each of the last mentioned said two parts having at least one opening therein for respectively receiving said overhead cable and said underground cable whereby said conductive clamps may be disposed in side-by-side relation within said protective housing.

2. A device as set forth in claim 1 wherein each sleeve is slidable on the conductive clamp which it surrounds.

3. A device as set forth in claim 1 wherein each insulating sleeve is made of elastomeric material and the end of one part of an insulating sleeve fits within the end of the other part of an insulating sleeve and wherein the parts of an insulating sleeve have peripheral lips engageable in watertight relationship.

4. A device as set forth in claim 3 wherein one part of an insulating sleeve has a peripheral protrusion and the other part of an insulating sleeve has a peripheral groove for receiving the peripheral protrusion of said one part.

5. A device as set forth in claim 3 wherein the opposite end of an insulating sleeve are in watertight engagement with the insulation on the conductors which are connected by the conductive clamp which is surrounded by the insulating sleeve.

6. A device as set forth in claim 1 wherein one part of said protective housing is made of an elastomeric material and has a plurality of elastic nipples, one for each insulated conductor of the overhead cable, in watertight engagement with the insulation of the conductor received thereby and wherein the parts of said protective housing have peripheral lips which interengage in watertight relationship.

7. A device as set forth in claim 6 wherein one of the parts of said protective housing has a peripheral protrusion and the other of the parts of said protective housing has a peripheral recess for receiving said peripheral protrusion.

8. A device as set forth in claim 6 wherein said one part of said protective housing has a portion with a square inner cross-section and the diagonals of the square respectively lie substantially in planes which pass through the axes of pairs of spaced nipples.

9. A device as set forth in claim 6 wherein the parts of said protective housing meet at a joint therebetween and wherein there is a rigid ring inside said joint and bearing against a portion of one of the last-mentioned said parts and an outer peripheral clamping means outside the joint and radially pressing said last mentioned said parts together to lock the parts of said protective housing together.

10. A device as set forth in claim 9 wherein said clamping, means is slidable on said protective housing.

11. A device as set forth in claim 6 wherein said underground cable is received by the other of said parts of said protective housing and further comprising an elastic skirt extending from said other of said parts of said protective housing to the insulation on said underground cable to provide a watertight seal therebetween.

12. A device as set forth in claim 11 further comprising a rigid ring between said skirt and the insulation of said underground cable, said rigid ring having an inner size larger than the outer size of the last-mentioned said insulation to permit said ring to slide on said last-mentioned insulation.

* * * * *

UNITED STATES PATENT AND TRADEMARK OFFICE
CERTIFICATE OF CORRECTION

PATENT NO. : 4,601,529

DATED : July 22, 1986

INVENTOR(S) : Claude Billet

It is certified that error appears in the above-identified patent and that said Letters Patent is hereby corrected as shown below:

Col. 1, line 68, "of" (second occcurrence) should read --or--;

Col. 4, line 49, "end" should read --ends--;

Signed and Sealed this

Fourth Day of November, 1986

[SEAL]

*Attest:*

DONALD J. QUIGG

*Attesting Officer*  Commissioner of Patents and Trademarks